(12) United States Patent
Koudil et al.

(10) Patent No.: US 8,487,151 B2
(45) Date of Patent: Jul. 16, 2013

(54) PROCESS AND APPARATUS FOR FILTRATION AND PRE-DISTRIBUTION OF GAS AND LIQUID PHASES IN A DOWN-FLOW CATALYTIC REACTOR

(75) Inventors: Abdelhakim Koudil, Lyons (FR); Christophe Boyer, Charly (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 317 days.

(21) Appl. No.: 12/808,849

(22) PCT Filed: Oct. 24, 2008

(86) PCT No.: PCT/FR2008/001502
§ 371 (c)(1),
(2), (4) Date: Dec. 21, 2010

(87) PCT Pub. No.: WO2009/092875
PCT Pub. Date: Jul. 30, 2009

(65) Prior Publication Data
US 2011/0092754 A1    Apr. 21, 2011

(30) Foreign Application Priority Data
Dec. 17, 2007  (FR) ..................................... 07 08852

(51) Int. Cl.
*C07C 7/163*     (2006.01)
(52) U.S. Cl.
USPC ........... 585/264; 422/217; 210/251; 210/284; 210/289; 210/290; 210/293; 210/498

(58) Field of Classification Search
USPC .. 210/251, 284, 289–293, 456, 498; 422/217; 585/264
See application file for complete search history.

(56) References Cited

U.S. PATENT DOCUMENTS

| 308,575 | A | * | 11/1884 | Puffer ........................... 210/151 |
| 3,607,000 | A | | 9/1971 | Beal et al. |
| 4,380,529 | A | * | 4/1983 | Gupta ........................... 422/220 |
| 5,670,116 | A | | 9/1997 | Gupta et al. |
| 5,817,227 | A | | 10/1998 | Mikitenko et al. |
| 6,689,329 | B2 | * | 2/2004 | Gupta et al. .................. 422/605 |
| 2006/0067858 | A1 | | 3/2006 | Boyer et al. |
| 2009/0177023 | A1 | | 7/2009 | Koudil et al. |

FOREIGN PATENT DOCUMENTS

| EP | 0050505 A | 4/1982 |
| EP | 0781830 A | 7/1997 |
| EP | 1640062 A2 | 3/2006 |
| FR | 2889973 A1 | 3/2007 |
| WO | PCT2008001502 R | 10/2008 |

* cited by examiner

*Primary Examiner* — Matthew O Savage
(74) *Attorney, Agent, or Firm* — Millen, White, Zelano & Branigan, P.C.

(57) ABSTRACT

The device described in the present invention allows pre-distribution of the gas and liquid feed supplying a reactor functioning in gas and liquid co-current downflow mode to be carried out by means of a pre-distribution plate comprising a filtration medium and an overflow tube in order to regulate the flow of liquid arriving on the distributor plate located downstream of said device.

More particularly, the present invention is applicable to the selective hydrogenation treatment of feeds containing acetylenic and dienic compounds.

18 Claims, 3 Drawing Sheets

US 8,487,151 B2

PROCESS AND APPARATUS FOR FILTRATION AND PRE-DISTRIBUTION OF GAS AND LIQUID PHASES IN A DOWN-FLOW CATALYTIC REACTOR

FIELD OF THE INVENTION

The invention relates to the field of distributor plates intended to supply chemical reactors operating in gas and liquid co-current downflow mode with gas and liquid.

Such reactors are encountered in the refining field, more particularly in reactions for the selective hydrogenation of various oil cuts, and more generally in hydrotreatments which require streams of hydrogen under high pressure and operate with heavy liquid feeds which may contain impurities constituted by solid plugging particles.

In some cases, the liquid feed contains impurities which may be deposited on the catalytic bed itself and, over time, reduce the interstitial volume of that catalytic bed.

Plugging liquid feeds which may be cited include mixtures of hydrocarbons containing 3 to 50 carbon atoms, preferably 5 to 30 carbon atoms, and possibly containing a non-negligible proportion of unsaturated or poly-unsaturated compounds acetylenic or dienic compounds, or a combination of those various compounds, the total proportion of unsaturated compounds being up to 90% by weight in the feed.

A representative example of feeds with which the present invention is concerned which may be cited is pyrolysis gasoline, "pyrolysis" indicating a thermal cracking process which is known to the skilled person.

The present invention can both limit the deposition of plugging particles within the catalytic bed and regulate the flow of liquid arriving on the distributor plate located downstream of the present device. For this reason, the present device is described as a pre-distribution filtration plate or filtering pre-distributor.

The distributor plate located downstream of the present pre-distributor is a distributor plate comprising vents which mix the gas and liquid, and has a minimum liquid level. As an example, such a downstream distributor plate may be analogous to that described in the French patent application filed with number: FR-2 889 973.

The pre-distributor described in the present invention enhances the capacity of the reactor to operate with plugging liquid feeds and guarantees a homogeneous supply of liquid for the downstream distributor plate (which will hereinafter be termed the "downstream plate", for simplicity).

When an obstruction occurs in a catalytic bed, the pressure drop of flow across the reactor is quickly observed to increase.

The pressure drop may become such that it obliges the operator to stop the reactor and replace part or all of the catalyst, which clearly causes a reduction considerable in the process cycle time.

An obstruction in a part of a catalytic bed may be due to a number of mechanisms.

Directly, the presence of particles in the feed stream may cause an obstruction by depositing said particles in the catalytic bed, having the effect of reducing the void fraction of the catalytic bed.

Indirectly, the formation of a layer of by-products derived from unwanted chemical reactions, which by-products are collectively known as "coke", which are deposited on the catalyst grain surface, may also contribute to reducing the void fraction of the bed.

Further, since the deposition of plugging particles generally occurs within the bed in a random manner, this may result in heterogeneities in the distribution of the void fraction from said bed which will result in the formation of preferential pathways for the liquid phase moving in downflow mode.

Such preferential pathways are extremely prejudicial from a hydrodynamic viewpoint as they severely disturb the homogeneity of the flow of phases in the bed and may result in heterogeneities as regards the progress of the chemical reaction and from a thermal viewpoint.

The present invention can reduce the probability of such phenomena arising. When they occur, it can increase the operating time of the reactor before blockage necessitates a stoppage.

EXAMINATION OF THE PRIOR ART

U.S. Pat. No. 4,313,908 and EP-0 050 505-B1 describe devices which can reduce the pressure drop produced in the catalytic bed and minimize its increase by deflecting part of the flow through tubes. A series of tubes forming a short circuit pass through the catalytic bed. The inlet for said tubes is located downstream of a distributor plate and the outlet from said tubes opens above the inlet to the catalytic bed at different levels. The system can thus independently deflect flows of gas and liquid provided that a level of liquid is established upstream of the bed. The device described in the cited patents cannot control the ratio between the deflected liquid and gas streams in the tubes comprising said system. The gas is deflected from the time the reactor starts operating and the liquid is only deflected when a sufficient liquid level is established above the bed due to fouling.

Further, at the outlet from the devices described in the two cited patents, there is no fluid distribution effect, which necessitates placing a distributor plate or an equivalent system downstream of the device. In the case of the present invention, a portion of the distribution function is incorporated into the filtration system to form a single device, even if the present device is coupled with a distributor plate placed downstream.

In U.S. Pat. No. 3,958,952, the plate with which that invention is concerned is constituted by a series of filtration units, each being constituted by alternating concentric empty chambers and chambers occupied by "filtration bodies" which are not described in detail.

In such a system, the filtration function is completely separate from the mixing and distribution function, while in the device of the present invention, the filtration bed and distribution provided by the vents dedicated to gas and by orifices in the plate for liquid are integrated.

The overflow tube integrated with the plate of the invention functions to stabilize the gas/liquid interface of the downstream plate and thus contributes to uniformly supplying said downstream plate with liquid.

The device described in the present invention is coupled with a distributor plate located downstream and has the effect of protecting it from any sudden irregularities in the flow of liquid.

It can be used to carry out a first filtration of the feed which may be completed at the distributor plate when the latter is provided with filtration elements, as is the case with the plate described in French patent application FR-A-2 889 973. However, the present device may be coupled with a downstream distributor plate not comprising a feed filtration element, in which case the device of the present invention provides the filtration function by itself.

BRIEF DESCRIPTION OF THE INVENTION

Figure 1:
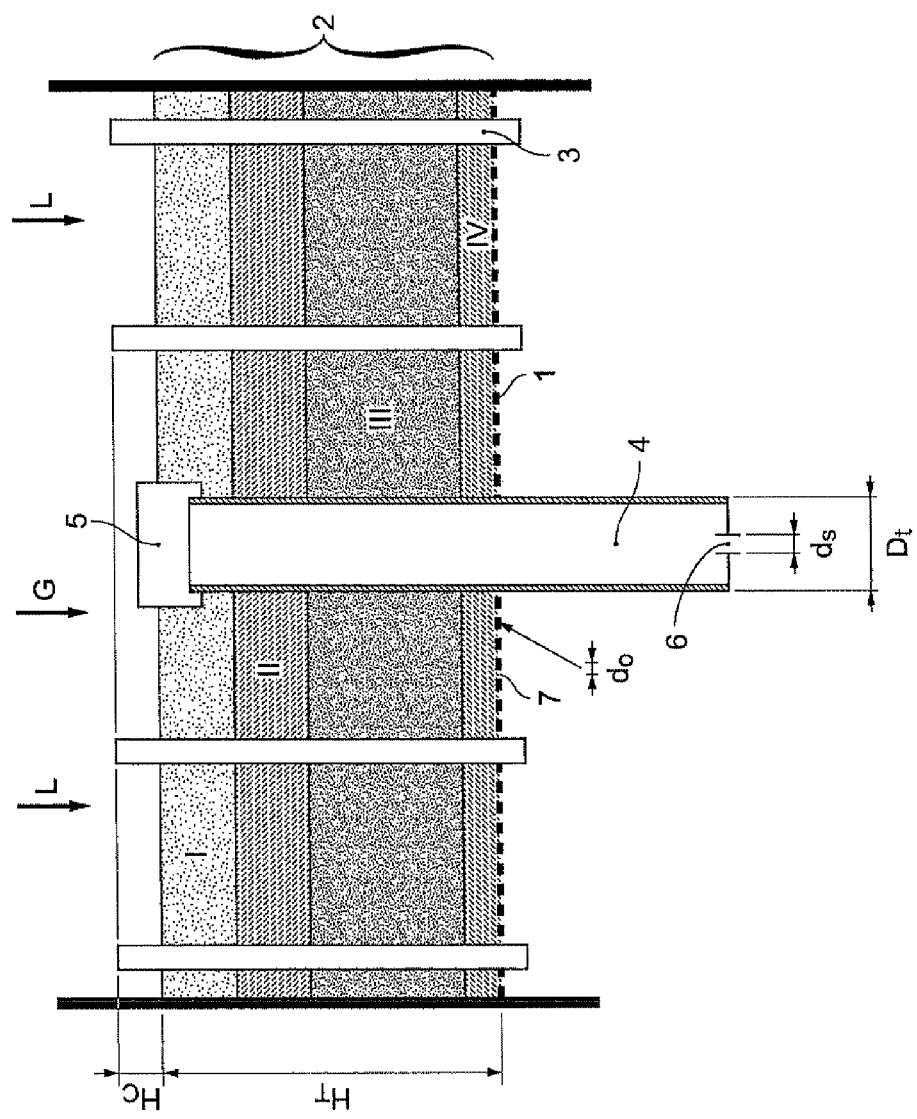
FIG. 1 shows a diagram of a pre-distribution filtration plate of the invention, said plate being placed upstream of a distributor plate as described in patent application FR-2 889 973.

The device described in the present invention can trap plugging particles contained in the liquid flow constituting the liquid feed of a reactor operating in gas and liquid co-current downflow mode, by means of a pre-distribution plate comprising a filtration medium.

This pre-distribution plate is also provided with at least one tube, termed the overflow tube, which is substantially vertical the lower end of which is located at a distance from the downstream distributor plate Di such that said distance Di is less than 300 mm, and preferably less than 200 mm.

In a preferred variation of the device of the invention, the overflow tube dips into the liquid phase of the downstream distributor plate such that if there is a severe and sudden variation in the flow rate of the liquid feed, repercussions due to that variation are attenuated at the downstream distributor plate.

Thus, the present device provides a dual function of filtration and regulation of the liquid flow. Further, it contributes to good distribution of gas and liquid since a major portion of the liquid flows through the orifices provided on the base of the pre-distribution plate and the gas flows through vents regularly distributed over the whole section of the pre-distribution plate.

More precisely, the device of the present invention can be defined as a plate for filtration and pre-distribution of a gas phase and a liquid phase constituting the supply for a catalytic reactor operating in gas and liquid co-current downflow mode, the liquid phase being charged with plugging particles, said pre-distribution plate being located upstream of a distributor plate, termed the "downstream" distributor plate 10, and being constituted by:
- a plate 1 perforated with orifices 7 with diameter d0, which is substantially horizontal and integral with the walls of the reactor, on which substantially vertical vents 3 are fixed which are open at their upper end to admit gas, and at their lower end to evacuate said gas, said plate supporting a filtration bed 2 surrounding the vents 3;
- at least one tube 4 termed an overflow tube acting as a liquid overflow, extending substantially vertically from an upper level located below the level of the upper end of the vents 3 to a lower level located at a distance Di from the base of the downstream distributor plate, Di being less than 300 mm, and preferably less than 200 mm.

In a preferred variation of the device of the invention, the tube acting as an overflow 4 extends to a lower level located in the liquid phase over the downstream distributor plate 10.

Preferably, the filtration bed in the device of the invention is constituted by a plurality of layers of solid particles which are generally inert, but which may in some cases be catalytically active.

The filtration bed may be constituted by a single layer of particles with dimensions in the range from the diameter d0 of the orifices 7 of said device and a value which does not exceed 30 mm.

Preferably, the filtration bed comprises at least two layers of particles and in this case, the upper first layer is constituted by inert particles with a diameter in the range 10 to 30 mm, and the lower second layer is constituted by inert particles with a diameter in the range 2 to 10 mm.

Preferably, the vents 3 acting to stream the gas are distributed regularly over the whole section of the pre-distribution plate, and the density of the vents is in the range 10 to 150 per $m^2$ of bed section, and preferably in the range 30 to 100 per $m^2$ of bed section.

Preferably, the diameter d0 of the orifices 7 to allow the passage of liquid onto the plate is in the range 2 to 10 mm, and more preferably in the range 3 to 6 mm.

The diameter Dt of the overflow tube 4 and the diameter ds of the outlet orifice 6 from said tube overflow are preferably calculated as a function of the diameter of the reactor Dr so as to be able to readily accommodate sudden irregularities in the liquid flow rates, without in any way disturbing the liquid phase over the downstream distributor plate 10.

The diameter Dt of the overflow tube 4 is an increasing function of the diameter of the reactor Dr and is preferably in the range 40 mm to 350 mm, more preferably in the range 70 mm to 250 mm.

The diameter ds of the outlet orifice 6 from said overflow tube is an increasing function of the diameter of the reactor Dr, and is preferably in the range 30 mm to 300 mm.

The precise diameter ds of the outlet orifice 6 from the overflow tube is determined by satisfying a rate criterion for the liquid egress which is preferably less than 150 cm/s, and more preferably less than 120 cm/s.

Preferably, the total height Ht of the filtration bed is in the range 100 mm to 800 mm, and more preferably in the range 200 mm to 600 mm.

Preferably, the vents 3 of the pre-distribution plate of the invention exceed the upper level of the filtration bed by a height Hc in the range 5 mm to 100 mm. Optionally, the vents 3 intended for the flow of gas are provided at their upper end with a cap to protect against the intrance of liquid. In this case, the diameter of the caps is preferably 10 mm larger than the diameter of the vents 3.

In the same manner, in order to limit the intrance of gas into the overflow tube 4, the upper portion of each overflow tube 4 may be provided with a cap 5. In this case, the diameter of the cap 5 is preferably at least 10 mm greater than the diameter Dt of the tube of said overflow tube 4.

Preferably, the upper portion of each overflow tube 4 remains contained within the filtration bed 2. The particular case of an overflow tube 4 being flush with the upper level of the filtration bed 2 is entirely encompassed within the scope of the invention.

The pre-distribution plate of the invention can supply a distributor plate 10 located downstream. Said distributor plate may be of any type and in particular of a type corresponding to that described in patent application FR-2 889 973.

Preferably, the downstream distributor plate 10 comprises vents for the flow of gas, said vents having lateral slits or orifices pierced in the side wall of said vents, to allow the intrance of liquid into the interior of the vents in which mixing with the gas phase occurs. Said gas and liquid mixing function is not desired in the vents 3 of the pre-distribution plate which thus generally do not have lateral openings.

Figure 2:
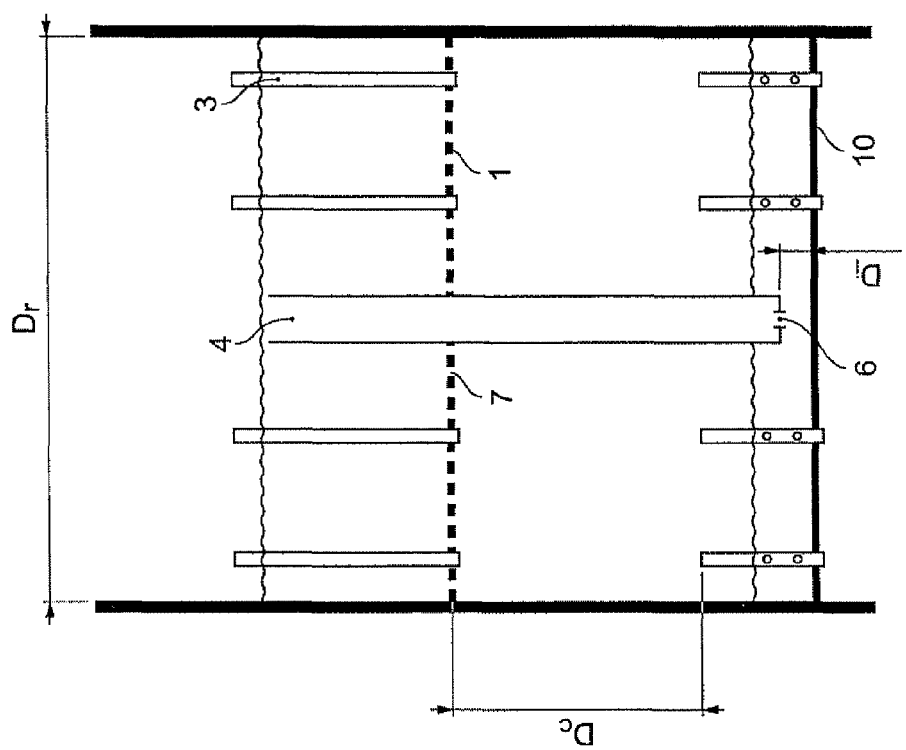
FIG. 2 shows an overall view of a reactor provided with a pre-distribution plate of the invention followed by a downstream distribution plate, thus also downstream of the catalytic bed per se, the gas and liquid feed flowing in co-current downflow mode along the catalytic bed.

The distance Dc separating the pre-distribution plate from the downstream distributor plate is such that the base plane of the device is located more than 50 mm from the highest portion of the downstream distributor plate 10. The expression "highest portion of the downstream distributor plate"

means the end of said plate with the greatest height. In general, it is the upper end of the vents provided in the downstream distributor plate 10, as shown in FIG. 2.

The device of the present invention may be applied to any type of reactor functioning in gas and liquid co-current downflow mode and operating on a plugging liquid feed.

In particular, the pre-filtration distribution device of the invention may be used in a hydrotreatment reactor, a selective hydrogenation reactor or a reactor for the conversion of residues or for the conversion of hydrocarbon cuts containing 3 to 50 carbon atoms, preferably 5 to 30.

The filtration and distribution device of the present invention can significantly extend the cycle period for the catalyst employed in the reactor, as will be illustrated in the example below. Usually, periodic replacement of the filtration bed is carried out with a periodicity of at least 6 months, more preferably at least 9 months.

DETAILED DESCRIPTION OF THE INVENTION

The present description is made with reference to FIGS. 1 and 2.

The device of the present invention is composed of a pre-distribution plate comprising a substantially horizontal base plane 1 (hereinafter termed the base plane) which is integral with the walls of the reactor, on which an assembly of substantially vertical vents 3 are fixed, provided with an upper opening located above the upper level of a filtration bed 2, and a lower opening located substantially at the level of the horizontal plane of the plate 1.

The base plane 1 is pierced with orifices 7 with a diameter d0 distributed regularly over the entire section of the plate 1.

The gas portion of the supply penetrates into the vents 3 via the upper opening and the liquid portion of the supply is introduced above the filtration bed 2 within which it is distributed progressively to leave the plate via the orifices 7 cut out of the base plane 1.

The distributor plate supports a filtration bed 2 constituted by at least one layer of granular solid acting as a filter, said solid granular bed surrounding each of the vents.

The vents 3 preferably project above the level of the filtration bed by a height Hc in the range 5 to 100 mm.

The filtration bed may comprise a plurality of layers of particles having any shape.

The size of the particles constituting each layer of the filtration bed preferably reduces from the top to the bottom of the filtration bed.

The mean size of the particles of the lower layer (or the lowest layer) is preferably less than the particle size of the catalyst constituting the catalytic bed located downstream of the distributor plate.

Usually, but not systematically, the particle size of each layer is between 2 mm and 30 mm.

In a variation of the filtration and distribution device of the invention, the filtration bed is composed of at least two layers of solid particles, the particle size of a given layer being less than that of the particles of the immediately superior layer.

In a particular variation of the device of the invention, the particle size of the upper layer of the filtration bed is in the range 10 to 30 mm, and the particle size of the lower layer is in the range 2 mm to 10 mm Purely by way of illustration, and without constituting any form of limitation, a filtration bed in accordance with a device of the invention may be constituted by:
- an upper layer representing 25% of the total height of the filtration bed, and composed of ACT 068 type particles, 25 mm in size;
- an intermediate layer representing 25% of the total height of the filtration bed, and composed of ACT 108 type particles, 8 mm in size;
- a lower layer representing 50% of the total height of the filtration bed and composed of inert particles with a size equal to or less than that of the catalyst grains.

The particles forming the filtration bed may have any shape, for example spherical or cylindrical, with or without an internal void volume. They are generally inert but may optionally be catalytic. In this latter case, the active particles of the filtration bed are preferably constituted by a catalyst from the same family as the catalyst used in the catalytic bed located downstream of the filtration bed.

The filtration bed may also be constituted by packing elements offering a large surface for capture of impurities while having a high void fraction, such as JOHNSON screen elements.

One example of the composition of a filtration bed with a plurality of layers is given in the following detailed example in the description.

For the majority of industrial reactors concerned, the total height of the filtration bed is preferably between 100 mm and 800 mm, and more preferably in the range 200 to 600 mm.

The internal diameter of the vents is preferably in the range 10 mm to 150 mm, and more preferably in the range 25 mm to 80 mm.

The vents 3 are preferably regularly spaced by a distance in the range 150 to 600 mm, more preferably in the range 300 to 500 mm.

The filtration bed plugs progressively over time, starting with the lower layers, and an interface is produced between the lower plugged portion and the upper, non-plugged portion.

The liquid passes through the filtration bed over its upper non-plugged portion, and finishes by reaching the upper level of the overflow tubes 4. It then passes through said overflow tube to be directly introduced close to the downstream distributor plate 10, preferably in the liquid phase of the downstream distributor plate 10.

The gas phase passes through the vents from their upper opening to their lower opening.

The upper opening of the vents is preferably located at a height Hc above the filtration bed which is in the range 5 to 100 mm. The upper openings of the vents 3 may be protected by a cap or any equivalent shape intended to prevent the direct introduction of liquid via said upper openings of the vents. In this case, the diameter of the caps coating the upper end of the vents 3 is 10 mm greater than the diameters of said vents.

In the same manner, the overflow tube or tubes 4 may be provided with caps or any equivalent folio, to prevent the introduction of gas.

In FIG. 1, the overflow tube 4 is provided with a cap the diameter of which is 10 mm greater than that of said overflow tube, to reduce as much as possible any intrance of gas into the overflow tube.

In FIG. 2, the overflow tube dips into the liquid phase of the downstream distributor plate, which corresponds to a preferred configuration.

By way of illustration, FIG. 1 shows a filtration bed constituted by 4 layers, from top to bottom:
- a first layer I which is 100 mm thick, constituted by inert ACT 068 type beads 25 mm in diameter;
- a second layer II which is 100 mm thick, constituted by inert ACT 108 type beads 8 mm in diameter;
- a third layer III which is 200 mm thick, constituted by catalyst particles 2 mm in diameter;
- a fourth layer IV of alumina beads 6.3 mm in diameter.

The term ACT is the trade name for beads sold by CTI located in Salindres (Gard).

EXAMPLE

The following example is a comparative example between two configurations of a selective hydrogenation reactor:
a configuration A with a single distributor plate;
a configuration B with the distributor plate of configuration A preceded by the pre-distribution plate with an overflow tube in accordance with the present invention.

The reactor had a diameter of 1 metre and a total height of 5 metres including the pre-distribution plate of the invention, the downstream distributor plate and the catalytic bed.

The catalytic bed was composed of particles of a traditional catalyst for carrying out selective hydrogenation. It was a catalyst containing Ni deposited on an alumina support.

The size of the catalyst particles forming the catalytic bed located downstream of the downstream distributor plate was 2 mm.

The supply to the reactor was composed of a liquid portion and a gas portion.

The liquid was constituted by a pyrolysis gasoline with a distillation range in the range 50° C. to 280° C. with a mean boiling point at 120° C. under standard conditions.

The gas phase was composed of 90 molar % of hydrogen, the remainder essentially being methane.

The pre-distribution plate of the invention had the following:
10 vents with a diameter of 50 mm, regularly distributed over said plate;
1 overflow tube with a diameter of 50 mm provided with an orifice with a diameter of 45 mm;
a filtration bed constituted by a lower layer 40 cm thick and an upper layer 10 cm thick.

The lower layer was constituted by particles of alumina 2 mm in diameter and the upper layer was constituted by ACT 068 type particles with a diameter of 25 mm.

The overflow tube was immersed in the liquid phase of the downstream distributor plate.

The downstream distributor plate had 40 vents with a diameter of 25 mm and a height of 175 mm, each vent being provided with lateral holes disposed in three stages to allow liquid to be introduced into the vents and mixing of liquid with gas.

The properties of the gas and the liquid under the operating conditions of the reactor are given in Table I below:

TABLE I

| Properties of fluids | |
|---|---|
| Density of liquid (kg/m$^3$) | 700 |
| Density of gas (kg/m$^3$) | 20 |
| Dynamic viscosity of liquid (Pa · s) | 0.0005 |
| Dynamic viscosity of gas (Pa · s) | 0.00002 |
| Concentration of plugging particles in liquid (grams/liter) | 0.05 |
| Liquid space velocity (cm/s) | 0.65 |
| Gas space velocity (cm/s) | 10.0 |

Figure 3:
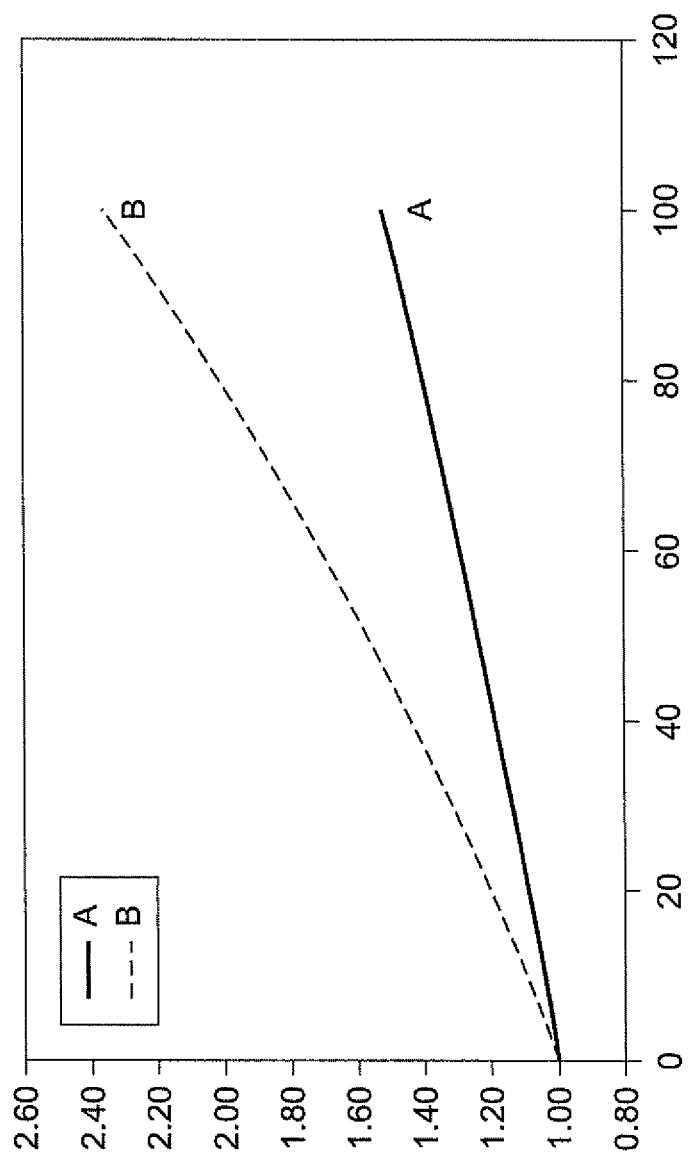
FIG. 3 used in the comparative example represents the change with time of the pressure drop taken between two points in the catalytic bed with and without the device of the invention.

The graph shown in FIG. 3 indicates the change in the pressure drop between two points in the catalytic bed with the pre-distribution plate of the invention (graph A) and without the pre-distribution plate (graph B).

The pressure drop, shown up the ordinate, is normalized with respect to the initial value which was determined using correlations which are well known in the art, and the time, along the abscissa, was measured in tens of hours.

It can be seen that the pre-distribution plate of the invention can reduce the pressure drop and more particularly its increase with time such that after 80 time units (800 hours), the relative pressure drop was 1.3 with the pre-distribution plate and 1.7 without the pre-distribution plate.

Another way to appreciate the effect of the pre-distribution plate of the invention is to fix the limiting admissible value for the pressure drop in the catalytic bed and to measure the respective times to reach said value, i.e. Ta with the pre-distribution plate and Tb without the pre-distribution plate. The difference between Ta and Tb (Ta−Tb) may be of the order of a few months, and typically 3 months, which represents a significant extension in the operating period of the reactor before stopping due to plugging.

The invention claimed is:

1. The device for filtration and pre-distribution of a gas phase and a liquid phase supplied to a catalytic reactor operating in gas and liquid co-current downflow mode, said device for filtration and pre-distribution comprising:
a perforated plate having orifices (7) with diameter (d0) and substantially vertical vents (3) fixed on said perforated plate which are open at their upper end to admit gas, and open at their lower end to evacuate gas, said perforated plate supporting a filtration bed surrounding the vents;
at least one overflow tube (4) extending substantially vertically from an upper level located below the level of the upper end of the vents and which remains contained within the filtration bed (2), to a lower level below said perforated plate;
said filtration bed comprising at least one layer of particles with a size in the range from the diameter (d0) of the orifices (7) of said device to a value which does not exceed 30 mm.

2. A device according to claim 1, wherein said filtration bed by comprises at least two layers of particles, an upper first layer constituted by inert particles with a diameter in the range of 10 to 30 mm, and a lower second layer constituted by inert particles with a diameter in the range of 2 to 10 mm.

3. The device according to claim 1, wherein the density of the vents (3) is in the range of 10 to 150 per m$^2$ of bed section.

4. The device according to claim 3, wherein the density of the vents (3) is in the range of 30 to 100 per m$^2$ of bed section.

5. The device according to claim 1, wherein the diameter (d0) of the orifices (7) of said perforated plate is in the range of 2 to 10 mm.

6. The device according to claim 5, wherein the diameter (d0) of the orifices (7) of said perforated plate is in the range of 3 to 6 mm.

7. The device according to claim 1, wherein the diameter of said at least one overflow tube (Dt) is in the range of 40 mm to 350 mm.

8. The device according to claim 7, wherein the diameter of said at least one overflow tube (Dt) is in the range of 70 mm to 250 mm.

9. The device according to claim 1, wherein the diameter (ds) of the outlet orifice of the overflow tube is in the range of 30 to 300 mm.

10. The device according to claim 1, wherein the total height (Ht) of the filtration bed is in the range of 100 mm to 800 mm.

11. The device according to claim 10, wherein the total height (Ht) of the filtration bed is in the range of 200 mm to 600 mm.

12. The device according to claim 1, wherein the vents of the plate exceed the upper level of the filtration bed by a height (Hc) in the range of 5 to 100 mm.

13. The device according to claim 1, wherein the upper portion of said at least one overflow tube is provided with a cap limiting the entrance of gas, wherein the diameter of said cap is at least 10 mm larger than that of said overflow tube (Dt).

14. A process for hydrotreatment, selective hydrogenation, residue conversion, or conversion of hydrocarbon cuts containing from 3 to 50 carbon atoms, said process comprising first subjecting a feed to filtration or pre-distribution in a filtration and pre-distribution device in accordance with claim 1.

15. A catalytic reactor operating in gas and liquid co-current downflow mode comprising:
   a reactor wall and means for introducing gas and liquid so that gas and liquid can flow co-currently downward;
   a device for filtration and pre-distribution of a gas phase and a liquid phase according to claim 1, and a distributor plate, wherein said device for filtration and pre-distribution is located upstream of said distributor plate;
   wherein said perforated plate is substantially horizontal and integral with the wall of the reactor, and
   said at least one overflow tube (4) extends to a lower level located at a distance (Di) from the base of the distributor plate, wherein the distance (Di) is less than 300 mm.

16. The reactor according to claim 15, wherein the distance (Di) is less than 200 mm.

17. The reactor according to claim 15, wherein the overflow tube extends to a lower level located within a liquid phase over the distributor plate.

18. The reactor according to claim 15, wherein the distance (Dc) separating the perforated plate of the device for filtration and pre-distribution from the distributor plate is such that the base plane of the device is located at most 50 mm from the uppermost portion of the distributor plate.

* * * * *

UNITED STATES PATENT AND TRADEMARK OFFICE
CERTIFICATE OF CORRECTION

PATENT NO.       : 8,487,151 B2
APPLICATION NO. : 12/808849
DATED            : July 16, 2013
INVENTOR(S)      : Koudil et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this
Eighth Day of September, 2015

Michelle K. Lee
*Director of the United States Patent and Trademark Office*